US011310060B1

(12) United States Patent
Poelstra et al.

(10) Patent No.: US 11,310,060 B1
(45) Date of Patent: Apr. 19, 2022

(54) ATOMIC CROSS-CHAIN SWAPS USING EQUIVALENT SECRET VALUES

(71) Applicant: Blockstream Corporation, Montreal (CA)

(72) Inventors: Andrew Poelstra, Austin, TX (US); Jonas Nick, Frankfurt am Main (DE)

(73) Assignee: Blockstream Corporation, Montreal (CA)

( * ) Notice: Subject to any disclaimer, the term of this patent is extended or adjusted under 35 U.S.C. 154(b) by 497 days.

(21) Appl. No.: 16/277,813

(22) Filed: Feb. 15, 2019

Related U.S. Application Data

(60) Provisional application No. 62/631,373, filed on Feb. 15, 2018.

(51) Int. Cl.
  *H04L 9/32* (2006.01)
  *H04L 9/30* (2006.01)
  *H04L 9/06* (2006.01)

(52) U.S. Cl.
  CPC .......... *H04L 9/3252* (2013.01); *H04L 9/3066* (2013.01); *H04L 9/3218* (2013.01); *H04L 9/3255* (2013.01); *H04L 9/0643* (2013.01); *H04L 2209/38* (2013.01); *H04L 2209/56* (2013.01)

(58) Field of Classification Search
  CPC ... H04L 9/3252; H04L 9/3066; H04L 9/3218; H04L 9/3255; H04L 9/0643; H04L 2209/38; H04L 2209/56
  See application file for complete search history.

(56) References Cited

U.S. PATENT DOCUMENTS

| 6,076,078 A | * | 6/2000 | Camp | G06Q 20/045 380/268 |
| 2015/0244690 A1 | * | 8/2015 | Mossbarger | H04L 9/006 713/171 |
| 2016/0330034 A1 | * | 11/2016 | Back | H04L 9/3255 |

OTHER PUBLICATIONS

Anonymous: "Atomin swap—Bitcoin Wiki", Jan. 28, 2018 (Jan. 28, 2018)Retrieved from "https://en.bitcoin.it/w/index.php?title=Atomic_swap&oldid=64931" (Year: 2018).*
(Continued)

*Primary Examiner* — Saleh Najjar
*Assistant Examiner* — Devin E Almeida
(74) *Attorney, Agent, or Firm* — Dergosits & Noah LLP; Todd A. Noah

(57) ABSTRACT

Systems and methods are described for using equivalent secret values across different elliptic curves. For example, a transferring party may wish to exchange a first asset on a first blockchain with a recipient for a second asset on a second blockchain. After exchanging sets of public keys with a recipient, a transferring party may generate a zero-knowledge proof and public keys associated with a selected bitstring. The recipient may then verify the proof, which shows that private keys associated with the public keys associated with the bitstring are both derived from the bitstring without revealing the bitstring itself. Once validity of the private keys has been established, the transferring party may publish a second signature to claim the second asset. The published second signature may then be used to publish a first signature (generated using the selected bitstring) on the first blockchain to claim the first asset.

17 Claims, 7 Drawing Sheets

(56) References Cited

OTHER PUBLICATIONS

Matteo Campanelli et al: "Zero-Knowledge Contingent Payments Revisited: Attacks and Payments for Services", IACR, International Association for Cryptologic Research, vol. 20171101:190916 Jun. 9, 2017 (Jun. 9, 2017), pp. 1-26, (Year: 2017).*

Jonathan Bootle et al.: "Efficient Zero-Knowledge Proof Systems", Foundations of Security Analysis and Design VIII, Sep. 3, 2016 (Sep. 31, 2016) (Year: 2016).*

Marek Jawurek et al.: "Zero-Knowledge Using Garbled Circuits: How to Prove Non-Algebraic Statements Efficiently", International Association for Cryptologic Research, vol. 20130826:095135, Aug. 26, 2013 (Aug. 261, 2013. pp. 1-23. (Year: 2013).*

\* cited by examiner

ATOMIC CROSS-CHAIN SWAPS USING EQUIVALENT SECRET VALUES

CROSS-REFERENCE TO RELATED APPLICATIONS

This application claims the benefit of U.S. Provisional Application No. 62/631,373, filed Feb. 15, 2018, which is incorporated herein in its entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital cryptocurrencies, and more specifically to transferring an asset from one blockchain using a first elliptic curve to a second blockchain using a different elliptic curve using a single secret value shared across the curves.

SUMMARY OF THE INVENTION

Systems and methods are described for using equivalent secret values across a first blockchain and a second blockchain, where each blockchain has a corresponding different elliptic curve. For example, a transferring party may have a first asset on a first blockchain, that is protected by a digital signature algorithm which uses a first elliptic curve, that they wish to exchange with a recipient for a second asset on a second blockchain (correspondingly protected by a digital signature algorithm using a second elliptic curve). To perform the transaction, the transferring party may, using a computing device, determine field elements in the scalar fields of both elliptic curves corresponding to the same selected bitstring, where the bitstring has a number of bits equal or fewer to the order of the smaller of the two elliptic curves. That is, the determined field elements may, after binary expansion, both be equal to the selected bitstring. The transferring party may then generate public keys on each of the first elliptic curve and the second elliptic curve corresponding to the determined field elements that are, again, related to the selected bitstring. The transferring party may also separately generate and transmit a first public key and a second public key to the recipient, the first public key being on the first elliptic curve and the second public key being on the second elliptic curve. The recipient may receive the public keys from the transferring party, and may in turn generate, by their own computing device, a third public key and a fourth public key, the third public key being on the first elliptic curve and the fourth public key being on the second elliptic curve. The third and fourth public keys may be transmitted to the transferring party, which may then create a first transaction on the first blockchain, the first transaction being associated with a first asset and a first signature comprising the first public key and the third public key.

The transferring party may also generate and transmit a zero-knowledge proof and the generated public keys associated with the selected bitstring to the recipient. The recipient may then verify the zero-knowledge proof, which shows when verified that the determined field elements are both derived from the bitstring without revealing the bitstring itself. The transferring party may also transmit an encrypted first partial signature and an encrypted second partial signature to the recipient, where the first partial signature corresponds to the first public key and the second partial signature corresponds to the second public key. The recipient may use the generated public keys, the first public key, and the second public key to verify that the encrypted first partial signature and the encrypted second partial signature include valid partial signatures for the first transaction and a second transaction on the second blockchain.

The recipient may then transmit a fourth partial signature corresponding to the fourth public key. When the transferring party receives the fourth partial signature, they may determine and publish a second signature comprising a second partial signature and the fourth partial signature on the second blockchain in a second transaction, thereby transferring a second asset to the transferring party. The published second signature may then be used by the recipient to derive and publish a first signature on the first blockchain in the first transaction to claim the first asset. To do so, the recipient may determine the selected bitstring from a second signature associated with a second transaction on the second blockchain, the determining being further based on the encrypted first partial signature and the encrypted second partial signature. Finally, the recipient claims the first asset by publishing the first signature comprising the first partial signature and a third partial signature on the first blockchain in a first transaction, thereby transferring a first asset, the published first signature being generated using the selected bitstring

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1A:
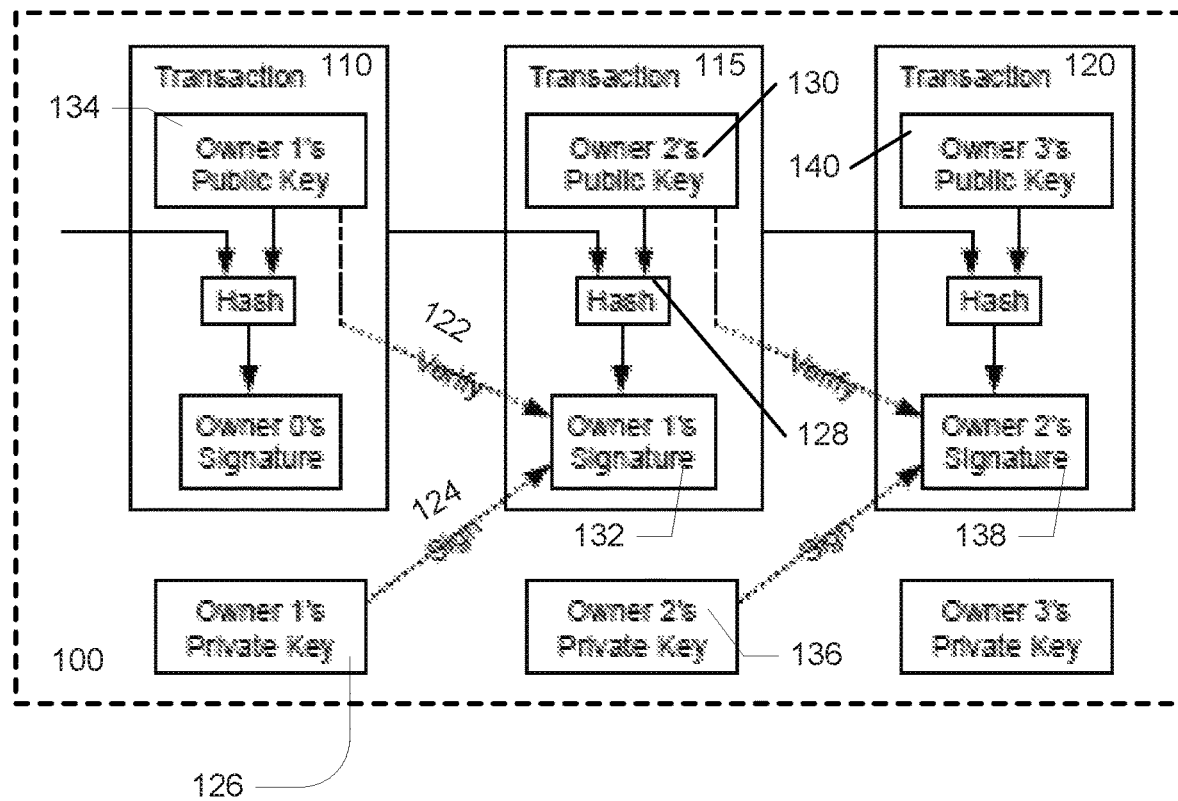
FIGS. 1A-B show simplified block diagrams of a chain of digital signatures of a plurality of transactions and a proof-of-work system, respectively, according to various embodiments.

Since the introduction of Bitcoin (see S. Nakamoto, *Bitcoin: A peer-to-peer electronic cash system*, 2009, https:// www.bitcoin.org/bitcoin.pdf, incorporated herein by reference) in 2009, there has been great interest in the potential of decentralized cryptocurrencies. Cryptocurrencies conventionally rely upon elliptic curve cryptography, where transactions on a blockchain are signed using a secret private key, and the signature may be verified using a corresponding public key without necessitating knowledge of the corresponding private key. Both the secret private key and the public key may be expressed as points on an elliptic curve, where the secret private key is a binary number modulo a large prime number.

Transferring assets between different blockchains is conventionally a difficult task to perform without compromising the zero-trust advantage of using decentralized cryptocurrencies. Different blockchains may use different elliptic curves (e.g., a first blockchain may use the elliptic curve "ed25519," while a second blockchain may use a second elliptic curve "secp256k1"), and there is conventionally no meaningful way to map secret key points from one elliptic curve to secret key points on a different elliptic curve. This may be, for example, due to differing orders of the elliptic curve (i.e., differing numbers of bits used to express field elements in the scalar fields of the elliptic curves). Moreover, there also is no conventional way to map secret keys from a first elliptic curve to a second elliptic curve without revealing the secret key itself, thereby compromising the secrecy of the private key and defeating the purpose of the private key-public key feature of elliptic curve cryptography.

In more specific terms, executing separate transactions in an atomic fashion (i.e. where either all aspects of the transaction are performed, or none) is traditionally done with hash function preimages. That is, if two transactions require the preimage to the same hash, once one is executed, the preimage is exposed so that the other preimage can be executed as well. A "discrete log hash preimage", in which the map '$x \rightarrow xG$' is used as a hash function, may be used to protect secret values. In the above expression, G is a standard generator of some elliptic curve and 'x' is a scalar in an elliptic ring $Z/nZ$ that is isomorphic to G. On its domain, this map is collision-resistant (because it is an injective function) and preimage-resistant for random inputs (this is the discrete logarithm assumption), allowing the mapping to be used to hide secret random values. However, given two curves with respective generators G and H having orders $|G|$ and $|H|$ that are coprime, it would be desirable for cross-chain transactions to have xG and xH with "the same" x scalar, since it could ensure that the same party is active in the transactions on both chains. However, given that the scalar field for G has a different order than that of the scalar field for H, there has been no conventional way to relate a single scalar on different elliptic curves without revealing x.

A solution is described herein that allows a zero-knowledge proof to be constructed that proves that two private keys are related. Rather than taking x as an element of $Z/nZ$ for any value n, x may be converted to a binary integer in the range $[0, 2^k-1]$, where $2^k$ is less than or equal to the lesser of the function orders $|G|$ and $|H|$. Then the projection maps $Z \rightarrow Z/|G|Z$ and $Z \rightarrow Z/|H|Z$ give representations of x as elements of the scalar groups of G and H. The projection mappings are invertible when restricted to the domain of x.

The invertibility between x and field element representations of bitstring x allows both scalar representations of x to be viewed as equivalent to x when interpreted as binary numbers (i.e. bitstrings), and therefore equivalent to each other. To prove that the field element representations (i.e. the secret keys) are related to the same bitstring x without revealing x, a range proof may be used, as will be described below.

As is described below, two secret keys may be created for each participant in the transaction. Different computing devices may be used by each participant to generate the secret keys, as each participant may be responsible for generating their own secret keys in some embodiments. Participants may use computing devices to generate public versions of the two secret keys by multiplying each secret key by point G and point H respectively of elliptic curve groups. For the first elliptic curve group (the same applies towards the second group), the elliptic curve group $G^{\cdot}$ would be generated by the point G, and a 256-bit prime number p exists such that curve group $G^{\cdot}$ has p points. The integers mod p, denoted $Z/pZ$, are then isomorphic to $G^{\cdot}$ (having a one-to-one relationship) according to the mapping $x \rightarrow xG$. $Z/pZ$ are also referred to below as scalars (or field elements) and the p elements of $G^{\cdot}$ are also referred to as points. By multiplying the secret online key and the secret offline key by point G, points on the elliptic curve group $G^{\cdot}$ are associated with the keys while obscuring the secret key values to outsiders to the side chain.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 1B:
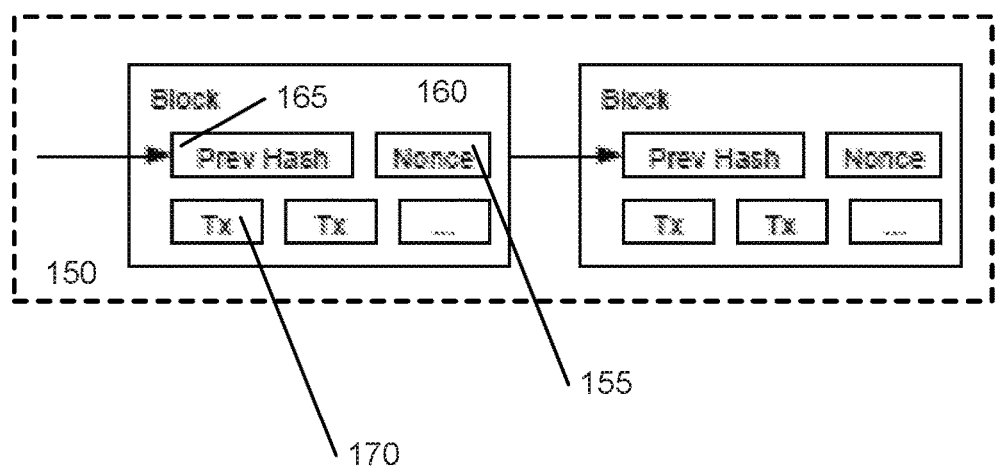

To further elaborate the storing and verification of transactions on blockchain ledgers in the context of the present invention, FIGS. 1A-B show simplified block diagrams of a chain of digital signatures 100 of a plurality of transactions and a proof-of-work system 150, respectively, according to various embodiments. The chain of digital signatures may be, for example, a ledger entry stored on a server of a side chain to a main blockchain. In the digital signature chain 100, each owner transfers amounts of the assets to the next owner by digitally signing a hash of the previous transaction involving the assets and the public key of the next owner, and adding these to the end of each asset. A payee can verify the transferred signatures to verify the chain of ownership, thus showing the asset to be legitimate. For example, in transaction 115, the transferring owner, Owner 1, digitally signs hash 128 of previous transaction 110 involving the transferred asset and the public key 130 of Owner 2, the recipient of the asset, to produce a signature for Owner 2 132 at step 124. To perform the step of verifying the signature, Owner 2 may use Owner 1's public key 134 at verification step 122. Subsequent transaction 120 may be implemented in the same fashion as transaction 115. In some embodiments, Owner 2 may be the same as Owner 1, such as when a participant of a side chain wishes to transfer side chain assets back to the main block chain.

To assist in making sure a previous owner of an asset did not transact the same asset twice, a proof of work system 150 may be implemented on each block in a ledger. The proof-of-work may be implementing by incrementing a nonce (number used once, a conventional cryptographic concept)

155 in the block 160 until a value is found that gives the block's previous hash 165 the required zero bits initially recorded with the asset. As seen in system 150, each block 160 may optionally include a ring signature 170 to prove soundness in blockchain applications where transaction amounts are cryptographically hidden.

In the atomic cross-chain swaps described herein, the above-described transaction flow may be modified in several key respects. On both blockchains, a first transaction will show a single participant signing over their asset to a public key that includes partial keys created by both participants. For example, the transferring party would place their signature 132 in a transaction 115 to a public key 130 of "Owner 2," which would include partial keys created by both the transferring party and the recipient. The joint public key 130 would correspond to a joint private key 136 that would also include partial keys from each participant. To complete the transaction, a multisignature 138 including partial signature from each party would be attached to the asset in transaction 120, which the recipient would attach their own public key 140 to claim the asset.

Figure 2:
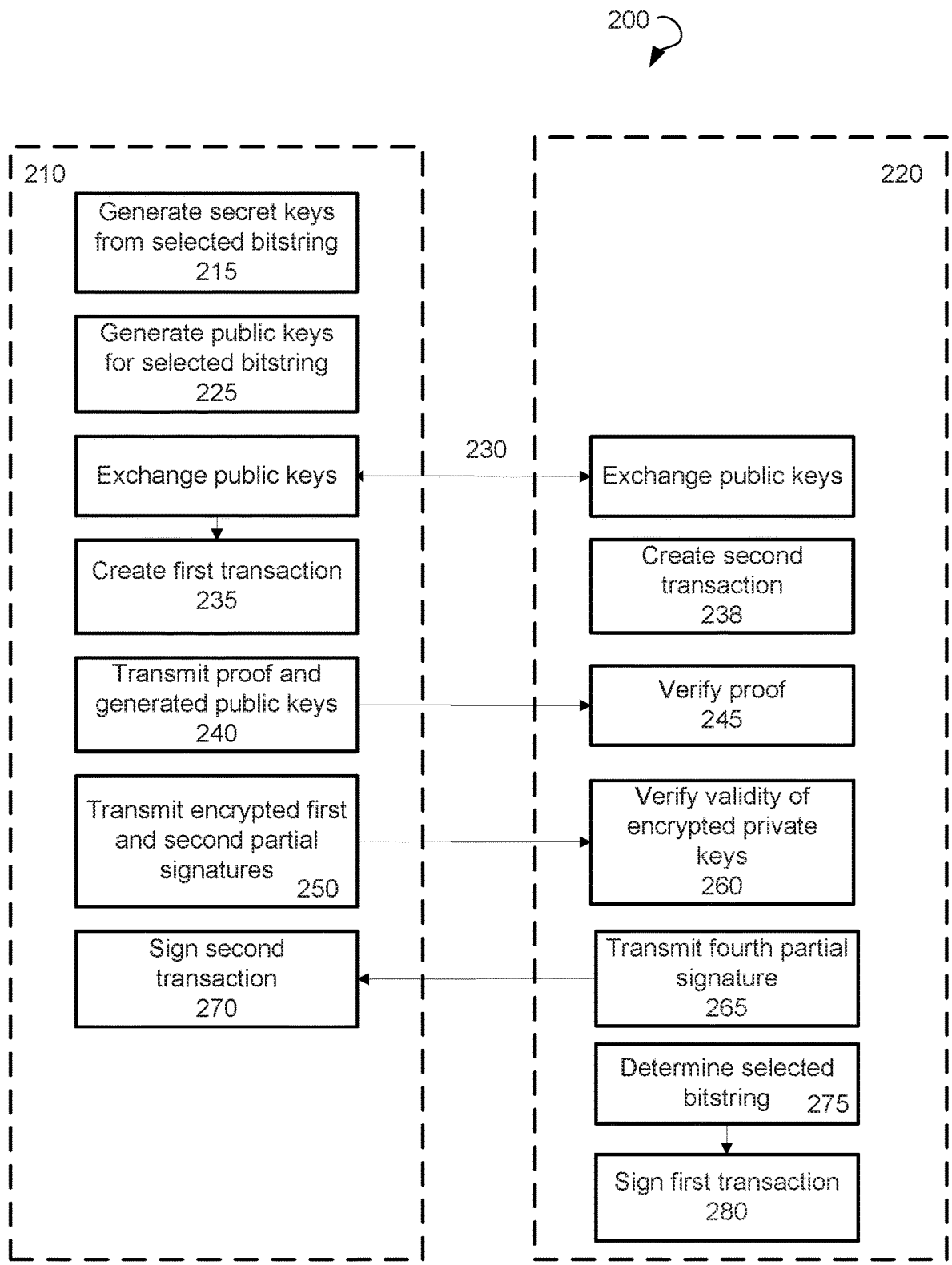
FIG. 2 shows a flow diagram for using equivalent secret values to perform an asset swap across a first blockchain and a second blockchain, under an embodiment.

FIG. 2 shows a flow diagram for a method 200 for using equivalent secret values to perform an asset swap across a first blockchain and a second blockchain, under an embodiment. The transaction as shown is between a transferring party using one or more computing devices 210 and a recipient party using one or more computing devices 220. The transferring party 210 may have a first asset on a first blockchain, that is encrypted using a first elliptic curve, that they wish to exchange with the recipient 220 for a second asset on a second blockchain (correspondingly encrypted using a second elliptic curve). In an exemplary embodiment, the two parties may be attempting to exchange edcoins for secpcoins, two hypothetical cryptocurrencies whose blockchains support Schnorr signatures using the ed25519 and secp256k1 elliptic curves, respectively. (For a description of Schnorr signatures, see Wuille et als, *Schnorr BIP*, 2018, https://github.com/sipa/bipsiblobibip-schnorribip-schnommediawiki, incorporated herein by reference) The following does not depend on the specific choice of secp256k1 or ed25519; any two elliptic curve groups will suffice as long as the discrete logarithm problem is of sufficient difficulty to provide security in both of them.

To perform the transaction, the transferring party may, using a computing device, determine secret keys on both elliptic curves corresponding to the same selected bitstring at step 215. That is, the determined field elements may, after binary expansion, both be equal to the selected bitstring. The transferring party may then generate public keys on each of the first elliptic curve and the second elliptic curve corresponding to the determined field elements at step 225. These generated public keys are also related to the selected bitstring. In the example described above, the bitstring and its corresponding generated public keys may be expressed as:

$$(a_{adapt}, A_{adapt}^{ed}, A_{adapt}^{secp}).$$

The selected bitstring $a_{adapt}$ may be a special object, a number smaller than the order of the smallest scalar group between the ed and secp elliptic curves. Selected bitstring $a_{adapt}$ may be a binary number which can be put into one-to-one correspondence with some subset of secp256k1 secret keys and some subset of ed25519 secret keys. Public key, $A_{adapt}^{secp}$ is then the secp256k1 public key corresponding to $a_{adapt}$ read as a secp256k1 scalar. Likewise, $A_{adapt}^{ed}$ is the ed25519 public key corresponding to $a_{adapt}$ read as an ed25519 scalar.

At step 230 the parties may exchange public keys for both elliptic curves. Accordingly, the transferring party would generate and transmit a first public key and a second public key to the recipient, the first public key being on the first elliptic curve and the second public key being on the second elliptic curve. In example of FIG. 2, the transferring party 210 would generate key pairs ($a_{secp}$, $A_{secp}$) and ($a_{ed}$, $A_{ed}$). Here $a_{secp}$ is understood to be a secret secp256k1 key, i.e. a member of the scalar group corresponding to the secp256k1 curve, and $A_{secp}$ is the corresponding public key, i.e. an element of the secp256k1 elliptic curve group. Similarly, $A_{ed}$ is an element of the ed25519 group and $a_{ed}$ is the corresponding secret key, in the ed25519 scalar group. To generate the private keys, $a_{secp}$ may be chosen uniformly at random from the space of all secp256k1 secret keys, and $a_{ed}$ may be chosen from the space of all ed25519 keys. Selected bitstring $a_{adapt}$ may be selected from the space of all bitstrings of an appropriately chosen length. From these choices all public values are determined completely and can be efficiently computed. While selected bitstring $a_{adapt}$ can be trivially used to compute both $A_{adapt}^{ed}$ and $A_{adapt}^{secp}$, someone who does not possess $a_{adapt}$ cannot do this computation, and in fact has no way to determine whether $A_{adapt}^{ed}$ and $A_{adapt}^{secp}$ are related in any way.

The recipient would likewise generate and transmit a third public key and a fourth public key, the third public key being on the first elliptic curve and the fourth public key being on the second elliptic curve. In the exemplary embodiment, the recipient would produce two keypairs ($b_{secp}$, $B_{secp}$) and ($b_{ed}$, $B_{ed}$). As with the transferring party, these keypairs would include secret and public objects in elliptic curves secp256k1 and ed25519, respectively. Similarly to the situation with the transferring party, $b_{secp}$ and $b_{ed}$ may be chosen uniformly at random from their respective keyspaces, and may be used to determine $B_{secp}$ and $B_{ed}$ respectively, which would be sent to the transmitting party at step 230. Note that a private key may also be referred to herein as a secret key, a field element, a scalar, and a scalar group element.

After the keys have been exchanged, the transferring party may then create a first transaction on the first blockchain, the first transaction being associated with a first asset and a combined public key that includes the first public key and the third public key. The creating the first transaction includes moving the first asset into a jointly-controlled (by the transferring party and the recipient) transaction output ($T_{ed}$, in the exemplary embodiment). Including the combined public key in the transaction means that the first asset may only be spent by use of a secret key that includes the first private key and the third private key. In the exemplary embodiment, the transferring party 210 would include their edcoin into a transaction output on the first blockchain which can only be spent by the key $A_{ed}+B_{ed}$; that is, it can only be spent by the two parties 210 and 220 cooperating to produce a multisignature on the first transaction.

Similarly, the recipient at step 238 may create a second transaction on the second blockchain, the second transaction being associated with a second asset and a combined public key that includes the second public key and the fourth public key. As with the first transaction, the creating the second transaction includes moving the second asset into a jointly-controlled (by the transferring party and the recipient) transaction output. In the exemplary embodiment, the recipient would include their secpcoin into a transaction output on the second blockchain which can only be spent by the key $A_{secp}+B_{sec}$. While combining keys to produce a multisignature scheme on a block may be used, other schemes may be used instead to provide greater security. For example, an alternate scheme, such as MuSig (see G. Maxwell et als, 2018, *Simple Schnorr Multi-Signatures with Applications to Bitcoin*, https://eprint.iacr.org/2018/068, incorporated herein by reference), may be used instead. Also, in some embodiments, each party's assets may have an alternate spending path which allows the original party to recover their coins after a timeout, in case the protocol fails (to preserve atomicity, while not unduly locking up coins for a failed transaction).

At step 240, the transferring party may generate and transmit a zero-knowledge proof and the generated public keys associated with the selected bitstring (from step 225) to the recipient. The specifics of the generation of the zero-knowledge proof are discussed below, in the text accompanying FIG. 3. In the exemplary embodiment, using the bitstring expression of $a_{adapt}$, the transferring party 210 may produces a zero-knowledge proof $\zeta$, and may transmit generated public keys $A_{adapt}^{secp}$, $A_{adapt}^{ed}$, and $\zeta$ to the recipient. The recipient may then verify the zero-knowledge proof at step 245, which may show that the determined field elements are both derived from the bitstring without revealing the bitstring itself. By verifying the generated public keys, the recipient may be assured that the generated public keys were produced by the same bitstring $a_{adapt}$, though the proof does not reveal this bitstring.

At step 250, the transferring party may also transmit an encrypted first partial signature and an encrypted second partial signature to the recipient, where the first partial signature corresponds to the first public key and the second partial signature corresponds to the second public key. The encrypted partial signatures may include the corresponding partial signatures (which in turn may include corresponding private keys). The partial signatures are, in an embodiment, encrypted to include the selected bitstring (as is detailed in the description below in further detail, in the discussion of FIG. 3). The recipient may use the generated public keys, the first public key, and the second public key to verify that the encrypted first partial signature and the encrypted second partial signature include valid partial signatures for the first transaction and a second transaction on the second blockchain at step 260. The recipient may perform the verification by multiplying the encrypted partial signatures by their respective curve generator functions and comparing the product to a sum of previously-received elements (which is also described below in further detail, in the discussion of FIG. 5). If the encrypted partial signatures are shown to be valid, the recipient may be assured that a valid signature on either blockchain may be used to determine the selected bitstring.

The recipient may then transmit a fourth partial signature corresponding to the fourth public key at step 265. When the transferring party receives the fourth partial signature, they may compute a second partial signature corresponding to the second public key, and combine the second and fourth partial signatures (e.g., by addition) to form a second signature. The transferring party may then publish the second signature on the second blockchain in a second transaction at step 270, thereby transferring a second asset to the transferring party. In the exemplary embodiment, the transferring party may add their computed second partial signature $s_{secp}^A$ to received fourth partial signature $s_{secp}^B$ to produce a complete signature $s_{secp}$ on second transaction $T_{secp}$. The transferring party may then publish signature $s_{secp}$ to a block on the secpcoin blockchain, allowing the transferring party to take their coins.

The published second signature may then be used by the recipient to derive and publish a first signature on the first blockchain in the first transaction to claim the first asset. To do so, the recipient may determine the selected bitstring from a second signature associated with a second transaction on the second blockchain at step 275. In the exemplary embodiment, the recipient may use second signature $s_{secp}$, the encrypted second partial signature and the fourth partial signature $s_{secp}^B$ to calculate selected bitstring $a_{adapt}$. Using the selected bitstring and the encrypted first private key, the recipient may derive a partial signature for the first transaction. That is, the recipient may also use the selected bitstring $a_{adapt}$ to determine a first partial signature $s_{ed}^A$ from the received encrypted first partial signature $\sigma_{secp}^A$.

Finally, the recipient may claim the first asset by publishing the first signature, which includes a first partial signature and a third partial signature, on the first blockchain in the first transaction at step 280, thereby transferring a first asset. As noted above, the published first signature may be generated using the selected bitstring. In the exemplary embodiment, the recipient may determine a third partial signature $s_{ed}^B$ and add the third partial signature to first partial signature $s_{ed}^A$ to produce a complete signature $s_{ed}$ on first transaction $T_{ed}$. The recipient may then attach $s_{ed}$ to first transaction $T_{ed}$ and publish complete signature $s_{ed}$ to the edcoin blockchain to take possession of the edcoins.

Figure 3:
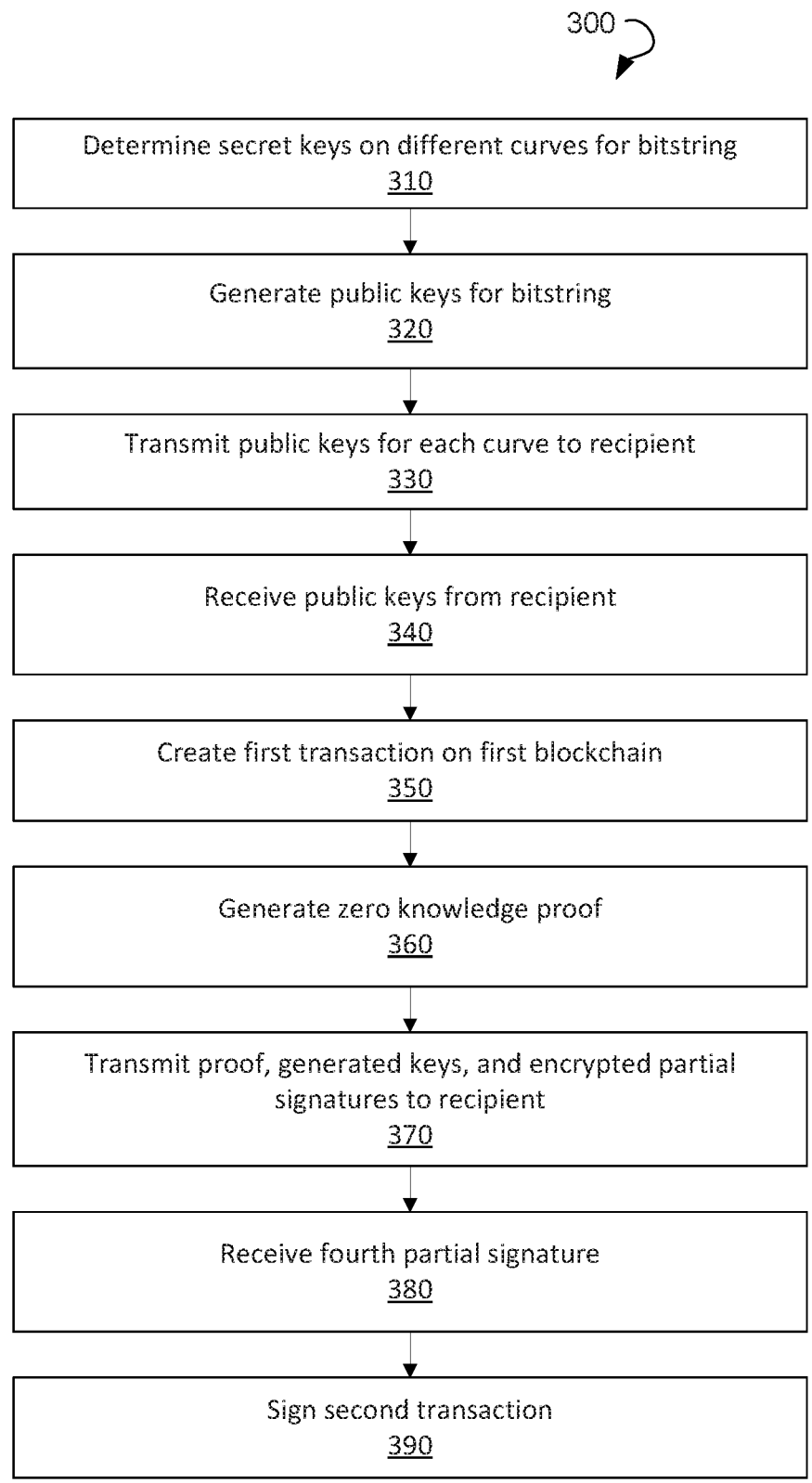
FIG. 3 shows a flow diagram of a cross-chain atomic swap from a transferring party's perspective, under an embodiment.

FIG. 3 shows a flow diagram of a method 300 of performing a cross-chain atomic swap from a transferring party's (e.g., transferring party 210) perspective, under an embodiment. In method 300, reference may be made to the exemplary edcoin-sepcoin transaction described above with respect to FIG. 2. To perform the transaction, the transferring party may, using a computing device, determine secret keys on both elliptic curves corresponding to the same selected bitstring at step 310. As described above, the bitstring may have a number of bits equal or fewer to the order of the smaller of the two elliptic curves. The transferring party may then generate public keys on each of the first elliptic curve and the second elliptic curve corresponding to the determined field elements that are, again, related to the selected bitstring at step 320. The transferring party may also separately generate and transmit a first public key and a second public key to the recipient, the first public key being on the first elliptic curve and the second public key being on the second elliptic curve, as described above at step 330. The transferring party may then receive a third public key and a fourth public key from the recipient at step 340. As described above, the third public key may be on the first elliptic curve and the fourth public key may be on the second elliptic curve.

The transferring party may then create a first transaction on the first blockchain, the first transaction being associated with a first asset, the first public key, and the third public key at step 350. In an exemplary embodiment, as part of the creation of the first transaction, the transferring party may generate ephemeral nonce pairs $(k_{ed}^A, R_{ed}^A)$ and $(k_{secp}^A, R_{secp}^A)$, which may be subsequently used to encrypt the first private key and second private key, as described below. The ephemeral nonce pairs may be used to provide a second secret field element, mixed with the signer's secret key in a deterministic way (as described below) during the signing process to produce a partial signature. By combining two secret elements (e.g., the private key and the secret key of the nonce pair), an extra variable is added to the private key to ensure that neither secret field element may be determined from the partial signature alone. The transferring party may then transmit $R_{ed}^A$, $R_{secp}^A$, and $T_{ed}$ to the recipient.

Figure 4:
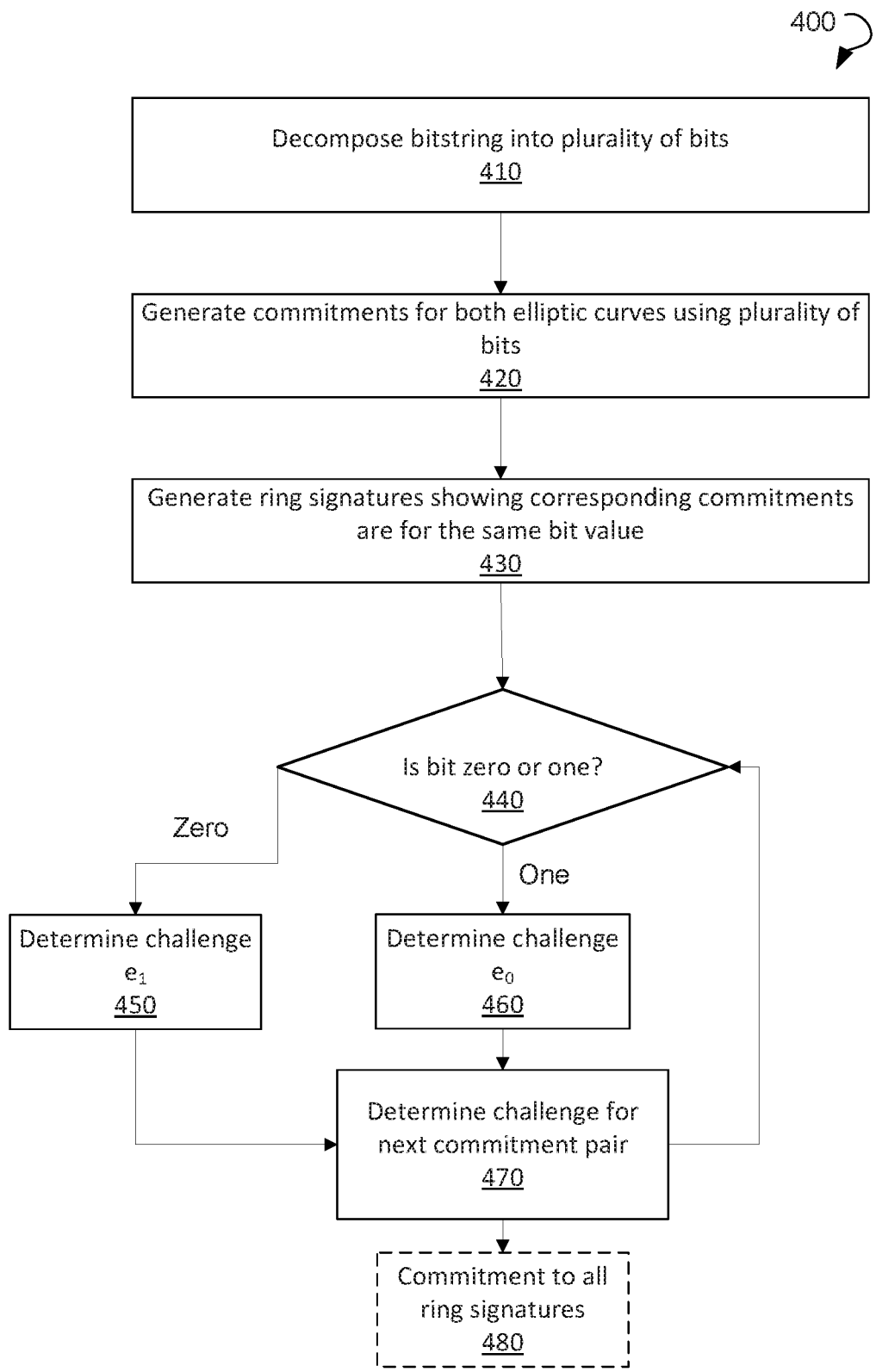
FIG. 4 shows a flow diagram for a transferring party to generate a zero-knowledge proof as part of a cross-chain asset swap, under an embodiment.

The transferring party may then generate the zero-knowledge proof at step 360. FIG. 4 shows a flow diagram for a method 400 the transferring party may use to generate a zero-knowledge proof as part of a cross-chain asset swap, under an embodiment.

At step 410 the selected bitstring may be decomposed into a plurality of bits. For example, for a selected bitstring x, x may be decomposed into bits $b_i$ such that $\Sigma_{\{i=1\}}{}^n 2^i * b_i = x$, where n is the bitlength of binary number x. For each bit of the plurality of bits, commitments may be generated in each elliptic curve at step 420. In an exemplary embodiment, for each bit $b_i$ of the plurality of bits, Pedersen commitments $G_i = b_i * G' + r_i * G$ and $H_i = b_i * H' + s_i * H$ may be generated, where G and G' are standard curve generators (e.g. points on an elliptic curve) for the first curve (e.g., ed25519) and H and H' are standard curve generators for the second curve (e.g., secp256k1). The values $r_i$ and $s_i$ may be blinding values where:

$$\Sigma_i 2^i * r_i = 0$$

$$\Sigma_i 2^i * s_i = 0$$

This implies that:

$$\Sigma_i 2^i * G_i = x * G$$

$$\Sigma_i 2^i * H_i = x * H$$

The result of the commitment generation may be two sets of commitments, one for the first elliptic curve and one for the second elliptic curve.

At step 430, ring signatures may be generated for each bit of the plurality of bits, where the ring signatures may show that the commitments for the first elliptic curve and for the second elliptic curve is for the same bit value for each bit of the plurality of bits. For example, for each $G_i$ and $H_i$, a ring signature may be constructed showing that $G_i$ and $H_i$ are both Pedersen commitments of the same value, which is a bit value of 0 or 1. If a bit has a value of one at step 440, challenge $e_0$ may be determined at step 460. To do so, the transferring party may choose scalar $j_i$ in the scalar group of G and scalar $k_i$ in the scalar group of H, both uniformly at random. The transferring party may then compute challenge $e_0 = H(G_i \| H_i \| j_i * G \| k_i * H)$, where $\|$ denotes concatenation. Scalars $a_{\{i,1\}}$ and $b_{\{i,1\}}$ may then be determined in the scalar groups of G and H, respectively, again uniformly at random. This allows challenge $e_1 = H(G_i \| H_i \| a_{\{i_1\}} * G - e_0 * G_i \| b_{\{i,1\}} * H - e_0 * H_i)$ to be computed. To complete the zero-knowledge proof for the bit, $a_{\{i,0\}} = j_1 + e_1 * r_i$ and $b_{\{i,0\}} = k_i + e_i * s_i$ may then be determined, leaving the signature to be $\{e_0, a_{\{i,0\}}, a_{\{i,1\}}, b_{\{i,0\}}, b_{\{i,1\}}\}$ for the bit of the plurality of bits. The method continues for the next bit of the plurality of bits at step 470, repeating until all bits have corresponding signatures.

If a bit has a value of zero at step 440, challenge $e_1$ may be determined at step 450. To do so, the transferring party may again choose scalar $j_i$ in the scalar group of G and scalar $k_i$ in the scalar group of H, both uniformly at random. The transferring party may then compute challenge $e_1 = H(G_i \| H_i \| j_i * G \| k_i * H)$. Scalars $a_{\{i,0\}}$ and $b_{\{i,0\}}$ may then be determined in the scalar groups of G and H, respectively, again uniformly at random. This allows challenge $e_0 = H(G_i \| H_i \| a_{\{i_1\}} * G - e_0 * (G_i - G') \| b_{\{i,1\}} * H - e_0 * (H_i - H'))$ to be computed. To complete the zero-knowledge proof for the bit, $a_{\{i,1\}} = j_1 + e_0 * r_i$ and $b_{\{i,1\}} = k_i + e_0 * s_i$ may then be determined, leaving the signature to be $\{e_0, a_{\{i,0\}}, a_{\{i,1\}}, b_{\{i,0\}}, b_{\{i,1\}}\}$ for the bit of the plurality of bits. The method continues for the next bit of the plurality of bits at step 470, repeating until all bits have corresponding signatures. The zero knowledge proof includes the signatures for each bit of the plurality of bits, where the signatures together show that the value x is within the range of possible values of any bitstring having the same length as x. The signatures may be ring signature, as described, for example, in G. Maxwell et als, 2017, *Confidential Transactions*, https://people.xiph.org/~greg/confidential_values.txt, incorporated herein by reference.

In some embodiments, the ring signatures for each elliptic curve may be combined by sharing a single commitment across them at step 480, as a Borromean Ring Signature (see G. Maxwell et al, 2015, *Borromean Ring Signatures*, https://github.com/Blockstream/borromean_paper/blob/master/borromean_draft_0.01_9adele49.pdf. incorporated herein by reference). The Borromean ring signature may be constructed by creating two separate ring signatures over the sets {G_i, G_i-G'} and {H_i, H_i-H'} respectively, where the hash challenges $e_0$ and $e_1$ (determined above) are shared across the signatures.

Returning to FIG. 3, the zero-knowledge proof and generated public keys associated with the selected bitstring may be transmitted to the recipient at step 370 for the recipient to verify and know that the determined field elements are both derived from the bitstring without revealing the bitstring itself. The transferring party may also transmit an encrypted first partial signature and an encrypted second partial signature to the recipient at step 370, where the first partial signature corresponds to the first public key and the second partial signature corresponds to the second public key. To encrypt the first and second partial signatures, the transferring party may use the public keys from the above-generated ephemeral nonce pairs $R_{ed}$ and $R_{secp}^A$, first transaction output $T_{ed}$, and received recipient nonce public keys $R_{ed}^B$, $R_{secp}^B$ and $T_{secp}$, a transaction output from the second transaction (also generated by the recipient). By hashing together $A_{secp} + B_{secp}$, $R_{secp}^A + R_{secp}^B$ and $T_{secp}$, the transferring party may determine a hash challenge $e_{secp}$, a scalar in the sep256k1 scalar group. Using the edcoin equivalents of the above variables, the transferring party may similar determine a challenge ed in the ed25519 scalar group. Next, the transferring party may calculate partial signatures for each of the two elliptic curve groups using the determined challenges. For the secp partial signature, in an exemplary embodiment the transferring party may use the formula:

$$Ss_{secp}^A = k_{secp}^A + e_{secp} \cdot a_{secp}.$$

Similarly, the ed partial signature for the transferring party may be determined as:

$$Ss_{ed}^A = k_{ed}^A + e_{ed} \cdot a_{ed}.$$

The first and second partial signatures may be further encrypted using the selected bitstring $a_{adapt}$. For example, the encrypted first partial signature may be determined by interpreting $a_{adapt}$ as an element of the ed25519 scalar group using the formula:

$$\sigma_{ed}^A = s_a^{ed} + a_{adapt}.$$

Likewise, the encrypted second partial signature may be determined by interpreting $a_{adapt}$ as an element of the secp256k1 scalar group using the formula:

$$\sigma_{secp}^A = s_a^{secp} + a_{adapt}.$$

Again, after the encrypted first and second partial signature have been derived, they may be transmitted to the recipient at step 370. The recipient may use the generated public keys, the first public key, and the second public key to verify that the encrypted first partial signature and the encrypted second partial signature include valid partial signatures for the first transaction and a second transaction on the second blockchain.

Figure 5:
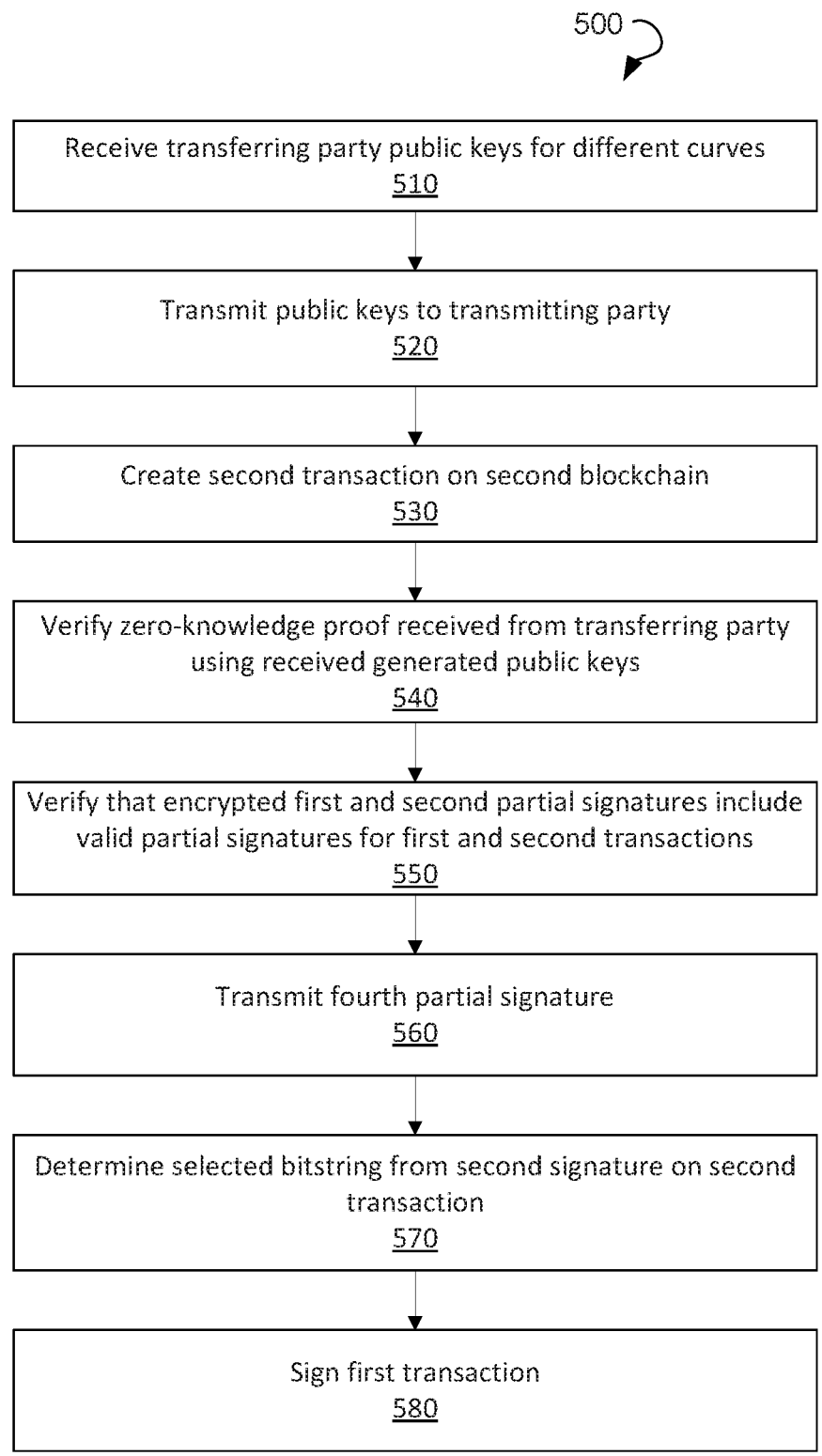
FIG. 5 shows a flow diagram of a cross-chain atomic swap from a recipient party's perspective, under an embodiment.

After the recipient has used the generated public keys, the first public key and the second public key to verify that the encrypted first partial signature and the encrypted second partial signature include valid partial signatures for the first transaction and the second transaction (without revealing either partial signature), the recipient may then transmit a fourth partial signature corresponding to the fourth public key. When the transferring party receives the fourth partial signature at step 380, they may publish a second signature comprising the second partial signature and the fourth partial signature on the second blockchain in a second transaction, thereby transferring a second asset to the transferring party. As described below, the published second signature may then be used by the recipient to derive and publish a first signature on the first blockchain in the first transaction to claim the first asset. To do so, the recipient may determine the selected bitstring from the second signature, the determining being further based on the encrypted second partial signature and the fourth partial signature. Finally, the recipient claims the first asset by publishing the first signature comprising a first partial signature and a third partial signature on the first blockchain in a first transaction, thereby transferring a first asset, the published first signature being generated using the selected bitstring FIG. 5 shows a flow diagram of a method 500 of performing a cross-chain atomic swap from a recipient party's (e.g., recipient party 220) perspective, under an embodiment. In method 500, reference may be made to the exemplary edcoin-sepcoin transaction described above with respect to FIG. 2. At step 510, the recipient may receive first and second public keys, on each of the first and second elliptic curves respectively, from the transferring party, and may in turn generate, by their own computing device, a third public key and a fourth public key, the third public key being on the first elliptic curve and the fourth public key being on the second elliptic curve. The third and fourth public keys may be transmitted to the transferring party at step 520, which may then create a first transaction on the first blockchain, the first transaction being associated with a first asset and a first signature comprising the first public key and the third public key (as is described above).

In response to receiving the first and second public keys from the transferring party, the recipient may create a second transaction on a second blockchain (e.g. the blockchain using the secp elliptic curve group) at step 530. In an exemplary embodiment, as part of the creation of the second transaction, having an output $T_{secp}$, the recipient may generate ephemeral nonce pairs $(k_{ed}^B, R_{ed}^B)$ and $(k_{secp}^B, R_{secp}^B)$, which may be subsequently used to encrypt the first private key and second private key, as described below. The recipient may then transmit $R_{ed}^B$, $R_{secp}^B$ and $T_{secp}$ to the recipient.

Figure 6:
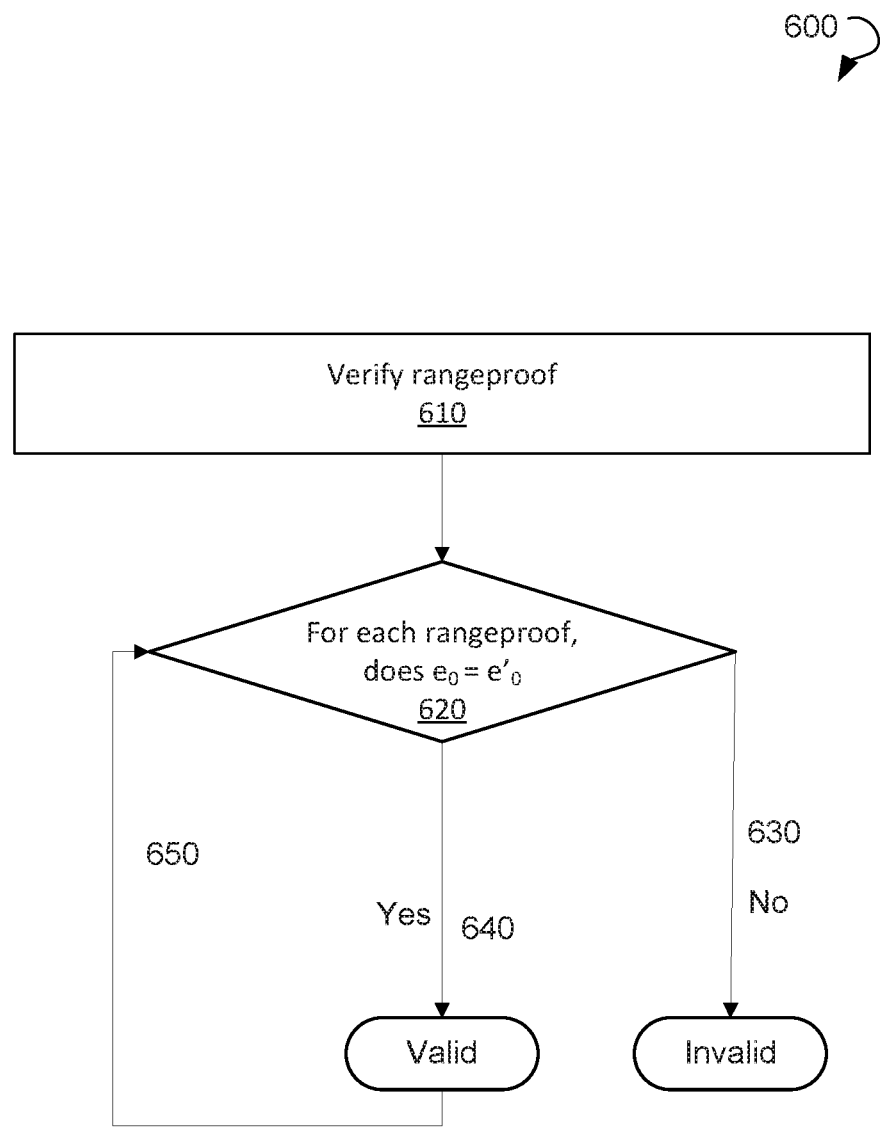
FIG. 6 shows a flow diagram for a recipient party to receive and solve a zero-knowledge proof, and to use an adaptor signature in a cross-chain asset swap, under an embodiment.

The transferring party may also generate and transmit a zero-knowledge proof and the generated public keys associated with the selected bitstring to the recipient. The recipient may then verify the zero-knowledge proof, which shows when verified that the determined field elements are both derived from the bitstring without revealing the bitstring itself, at step 540. FIG. 6 shows a flow diagram for a method 600 the recipient party may use to verify a zero-knowledge proof, under an embodiment. At step 610, the recipient verifies a rangeproof that includes the group of commitments derived above in the generation of the zero-knowledge proof of FIG. 4. In the exemplary embodiment, for each bit of the plurality of bits in the bit decomposition of selected bitstring x, the zero-knowledge proof includes commitments $G_i$ and $H_i$, and a signature $\{e'_0, a_{\{i,0\}}, a_{\{i,1\}}, b_{\{i,0\}}, b_{\{i,1\}}\}$. To verify the zero-knowledge proof (used herein interchangeably for the rangeproof) for the given bit, the recipient wishes at step 620 to determine if a determined $e_0$ value is equal to the received $e'_0$ value in the zero-knowledge proof. To determine $e_0$, the recipient may first compute $e_1 = H(G_i \| H_i \| a_{\{i,1\}} * G - e_0 * G_i \| b_{\{i,1\}} * H - e_0 * H_i)$. The recipient may then compute $e_0 = H(G_i \| H_i \| a_{\{i,1\}} * G - e_1 * (G_i - G') \| b_{\{i,1\}} * H - e_1 * (H_i - H'))$. If the computed e_0 value is equal to the received e'_0, then the signature is valid at step 640, and the verifier moves to the next bit at step 650. If the computed e_0 value is not equal to the received e'_0, then the rangeproof is not valid at step 630, and the transaction fails.

Returning to FIG. 5, the transferring party may also transmit an encrypted first partial signature and an encrypted second partial signature to the recipient, where the first partial signature corresponds to the first public key and the second partial signature corresponds to the second public key (as described above). After (or in parallel) with solving the zero-knowledge proof using the received generated public keys, the recipient may use the generated public keys, the first public key, and the second public key to verify that the encrypted first partial signature and the encrypted second partial signature include valid partial signatures for the first transaction and a second transaction on the second blockchain at step 550. As described above, the encrypted first partial signature and encrypted second partial signature may take the form of $\sigma_{ed}^A$ and $\sigma_{secp}^A$ respectively, where each a includes a partial signature for the respective elliptic curve and selected bitstring $a_{adapt}$ interpreted in the corresponding curve group. To verify the validity of the underlying partial signatures, the recipient may apply the following verification equations:

$$\sigma_{secp}^A G_{secp} = R_{secp}^A + eA_{secp} + A_{adapt}^{secp}$$

$$\sigma_{ed}^A G_{ed} = R_{ed}^A + eA_{ed} + A_{adapt}^{ed}.$$

In the verification equations, $G_{secp}$ and $G_{ed}$ are standard generators of the secp256ki and ed25519 elliptic curve groups respectively. If the equations hold true, the recipient is assured that a valid signature may be used from either transaction output $T_{secp}$ or $T_{ed}$ to determine the selected bitstring $a_{adapt}$. Furthermore the inverse is true as well; $a_{adapt}$ may be used to determine valid signatures on either transaction output $T_{secp}$ or $T_{ed}$ by subtracting the selected bitstring from the respective encrypted first or second partial signatures.

The recipient may then transmit a fourth partial signature corresponding to the fourth public key at step 560. The fourth partial signature may be determined by the recipient using the formula:

$$s_{secp}^B = k_{secp}^B + e_{secp} \cdot b_{secp}.$$

When the transferring party receives the encrypted fourth private key, they may publish a second signature that includes a sum of a second partial signature and the fourth partial signature on the second blockchain in a second transaction, thereby transferring a second asset to the transferring party.

The published second signature may then be used by the recipient to derive and publish a first signature on the first blockchain in the first transaction to claim the first asset. To do so, the recipient may determine the selected bitstring from a second signature associated with a second transaction on the second blockchain, the determining being further based on the encrypted second partial signature and the fourth partial signature, at step 570. As stated above, signature $s_{secp}$ is published by the transferring party on the second blockchain in the second transaction. From $s_{secp}$, $a_{adapt}$ may be determined as $a_{adapt}=a_{secp}{}^A-S_{secp}+A_{secp}{}^B$. Using $a_{adapt}$, the recipient may determine a partial signature that includes the first private key from the encrypted first private key using the formula:

$$s_{ed}{}^A=\sigma_{ed}{}^A-a_{adapt}.$$

Finally, the recipient claims the first asset by publishing the first signature, which may include a sum of a first partial signature and a third partial signature, on the first blockchain in a first transaction at step 580. To publish the first signature, the recipient determines the third partial signature. In an exemplary embodiment, the third partial signature may be determined as $s_{ed}{}^B=k_{ed}{}^B+e_{ed}\cdot b_{ed}$. The complete first signature on first transaction $T_{ed}$ may be then determined as $S_{ed}=s_{ed}{}^A+s_{ed}{}^B$. Publishing the first signature on the first blockchain (e.g., the edcoin blockchain) transfers the first asset to the recipient, completing the atomic cross-chain swap without compromising the secrecy of the private signatures, unlike any conventional cross-chain exchanges.

Figure 7:
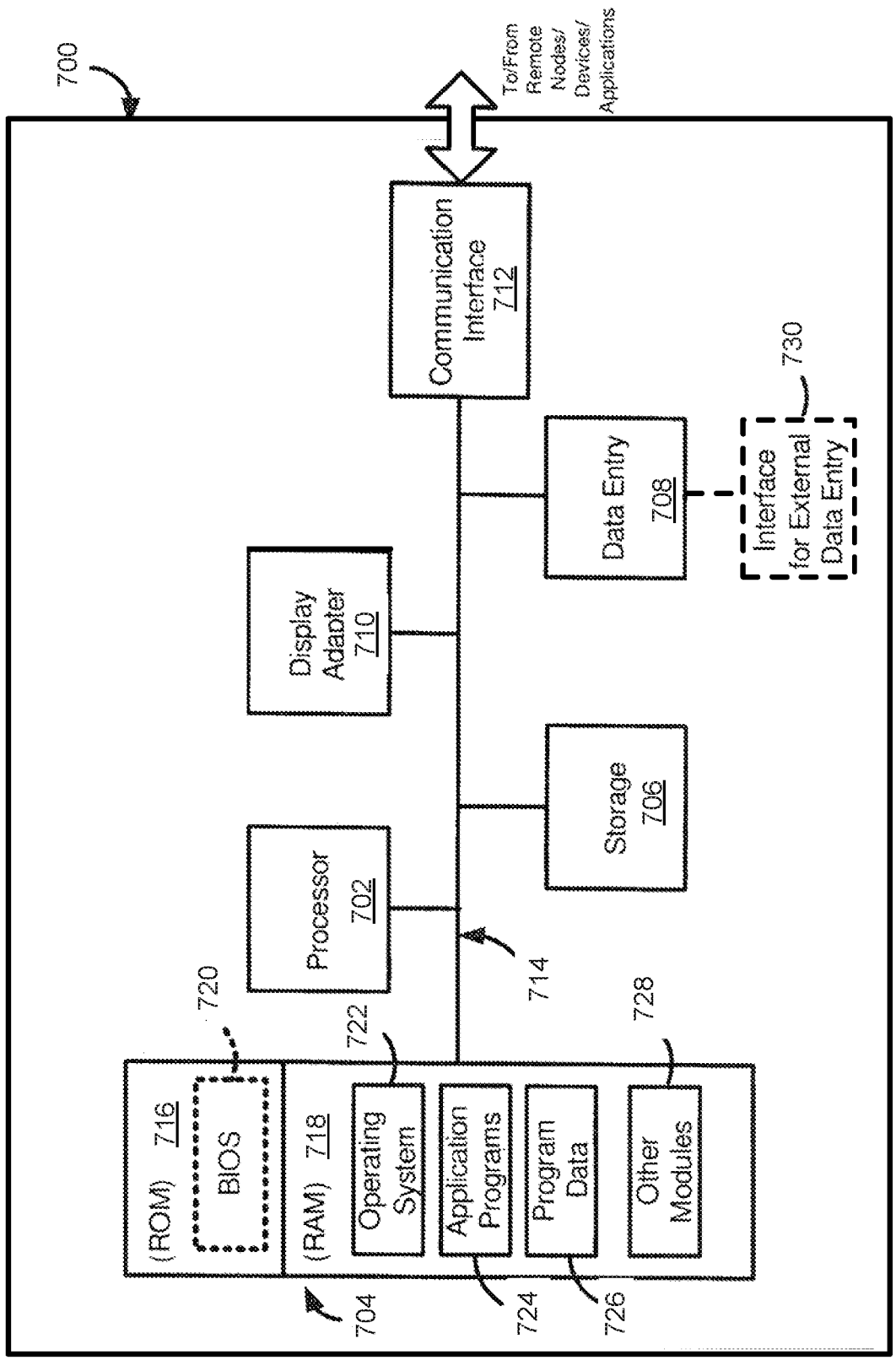
FIG. 7 is a block diagram of an exemplary system for using equivalent secret values to perform an asset swap across a first blockchain and a second blockchain in accordance with various embodiments of the present invention.

FIG. 7 is a block diagram of an exemplary system for transferring an asset on a side chain ledger to a main blockchain such that control of an address associated with a main blockchain may be proven without associating a participant identity with the address in accordance with various embodiments of the present invention. With reference to FIG. 7, an exemplary system for implementing the subject matter disclosed herein, including the methods described above, includes a hardware device 700, including a processing unit 702, memory 704, storage 706, data entry module 708, display adapter 710, communication interface 712, and a bus 714 that couples elements 704-712 to the processing unit 702.

The bus 714 may comprise any type of bus architecture. Examples include a memory bus, a peripheral bus, a local bus, etc. The processing unit 702 is an instruction execution machine, apparatus, or device and may comprise a microprocessor, a digital signal processor, a graphics processing unit, an application specific integrated circuit (ASIC), a field programmable gate array (FPGA), etc. The processing unit 702 may be configured to execute program instructions stored in memory 704 and/or storage 706 and/or received via data entry module 708.

The memory 704 may include read only memory (ROM) 716 and random access memory (RAM) 718. Memory 704 may be configured to store program instructions and data during operation of device 700. In various embodiments, memory 704 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 704 may also include nonvolatile memory technologies such as nonvolatile flash RAM (NVRAM) or ROM. In some embodiments, it is contemplated that memory 704 may include a combination of technologies such as the foregoing, as well as other technologies not specifically mentioned. When the subject matter is implemented in a computer system, a basic input/output system (BIOS) 720, containing the basic routines that help to transfer information between elements within the computer system, such as during start-up, is stored in ROM 716.

The storage 706 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 700.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 706, ROM 716 or RAM 718, including an operating system 722, one or more applications programs 724, program data 726, and other program modules 728. A user may enter commands and information into the hardware device 700 through data entry module 708. Data entry module 708 may include mechanisms such as a keyboard, a touch screen, a pointing device, etc. Other external input devices (not shown) are connected to the hardware device 700 via external data entry interface 730. By way of example and not limitation, external input devices may include a microphone, joystick, game pad, satellite dish, scanner, or the like. In some embodiments, external input devices may include video or audio input devices such as a video camera, a still camera, etc. Data entry module 708 may be configured to receive input from one or more users of device 700 and to deliver such input to processing unit 702 and/or memory 704 via bus 714.

The hardware device 700 may operate in a networked environment using logical connections to one or more remote nodes (not shown) via communication interface 712. The remote node may be another computer, a server, a router, a peer device or other common network node, and typically includes many or all of the elements described above relative to the hardware device 700. The communication interface 712 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 712 may include logic configured to support direct memory access (DMA) transfers between memory 704 and other devices.

In a networked environment, program modules depicted relative to the hardware device 700, or portions thereof, may be stored in a remote storage device, such as, for example, on a server. It will be appreciated that other hardware and/or software to establish a communications link between the hardware device 700 and other devices may be used.

It should be understood that the arrangement of hardware device 700 illustrated in FIG. 7 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 700. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 7. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for performing a swap using equivalent secret values across a first blockchain and a second blockchain, the first blockchain being based on a first elliptic curve and the second blockchain being based on a second elliptic curve, comprising:

determining, by a computing device, secret keys corresponding to a selected bitstring on each of the first elliptic curve and the second elliptic curve;

generating, by the computing device, public keys on the first elliptic curve and the second elliptic curve based on each of the determined secret keys, the generated public keys being associated with the selected bitstring;

transmitting a first public key and a second public key to a recipient, the first public key being on the first elliptic curve and the second public key being on the second elliptic curve;

receiving a third public key and a fourth public key from the recipient, the third public key being on the first elliptic curve and the fourth public key being on the second elliptic curve;

creating a first transaction on the first blockchain, the first transaction being associated with a first asset, the first public key, and the third public key;

generating a zero-knowledge proof, where the zero-knowledge proof shows when verified using the generated public keys that the determined secret keys are both derived from the bitstring without revealing the bitstring itself;

transmitting the zero-knowledge proof, the generated public keys, an encrypted first partial signature and an encrypted second partial signature to the recipient, where the first partial signature corresponds to the first public key and the second partial signature corresponds to the second public key, and further where the recipient uses the generated public keys, the first public key, and the second public key to verify that the encrypted first partial signature and the encrypted second partial signature include valid partial signatures for the first transaction and a second transaction;
receiving a fourth partial signature from the recipient; and
signing a second transaction with a second signature comprising the second partial signature and the fourth partial signature on the second blockchain, thereby transferring a second asset, the second signature being used by the recipient to derive and publish a first signature in the first transaction on the first blockchain.

2. The method of claim 1, the creating the first transaction further comprising creating a first ephemeral nonce pair and a second ephemeral nonce pair, the method further comprising transmitting nonce public keys from the two nonce pairs and an identifier of the created transaction to the recipient.

3. The method of claim 2, further comprising:
receiving, from the recipient, nonce public keys from each of a third ephemeral nonce pair and a fourth ephemeral nonce pair generated by the recipient and the second transaction; and
determining a challenge scalar for each of the first blockchain and the second blockchain, each challenge scalar being based on a hashing of a created nonce public key, a received nonce public key, the corresponding public keys and the corresponding transaction identifier for the blockchain in question, where the challenge scalars are used for the encryption of partial signatures used for each blockchain.

4. The method of claim 3, the transmitting the zero-knowledge proof comprising transmitting the determined challenge scalar and a set of commitments to a plurality of bits.

5. The method of claim 3, wherein the encrypted first partial signature comprises a sum of a first partial signature and the selected bitstring, the first partial signature being a combination of an ephemeral nonce private key, the challenge scalar, and the first private key.

6. The method of claim 5, wherein the first signature comprises the partial first signature and a partial second signature, the partial second signature being a combination of an ephemeral nonce private key, the challenge, and the third private key.

7. The method of claim 1, the encrypted first partial signature being a sum of bits that comprises the bitstring.

8. The method of claim 1, where the zero-knowledge proof is a ring signature.

9. A method for performing a swap using equivalent secret values across a first blockchain and a second blockchain, the first blockchain being based on a first elliptic curve and the second blockchain being based on a second elliptic curve, comprising:
receiving a first public key and a second public key from a transferring party, the first public key being on the first elliptic curve and the second public key being on the second elliptic curve;
generating, by the computing device, a third public key and a fourth public key from the recipient, the third public key being on the first elliptic curve and the fourth public key being on the second elliptic curve, the third public key being associated with a third private key and the fourth public key being associated with a fourth private key;
transmitting the third public key and the fourth public key to the transferring party;
creating a second transaction on the second blockchain, the second transaction being associated with a second asset and a second signature comprising the second public key and the fourth public key;
verifying a zero-knowledge proof using generated public keys received from the transferring party, the generated public keys both being derived from a selected bitstring, where a first generated public key is associated with the first elliptic curve and the second generated public key is associated with the second elliptic curve, the zero-knowledge proof verifying that the generated public keys are both derived from the selected bitstring without revealing the bitstring itself;
verifying that an encrypted first partial signature and an encrypted second partial signature received from the transferring party include valid private keys for the first transaction and a second transaction, where the first private key corresponds to the first public key and the second private key corresponds to the second public key, the verifying being performed using the generated public keys, the first public key, and the second public key;
transmitting a fourth partial signature corresponding to the fourth public key;
determining the selected bitstring from a second signature associated with a second transaction on the second blockchain, the determining being further based on the encrypted second partial signature and the fourth partial signature; and
signing a first transaction with a first signature comprising a first partial signature and a third partial signature on the first blockchain, thereby transferring a first asset, the published first signature being generated using the selected bitstring.

10. The method of claim 9, the creating the second transaction further comprising creating a first recipient ephemeral nonce pair and a second recipient ephemeral nonce pair, the method further comprising transmitting nonce public keys from the two recipient nonce pairs and an identifier of the created second transaction.

11. The method of claim 10, further comprising:
receiving, from the recipient, nonce public keys from each of a third ephemeral nonce pair and a fourth ephemeral nonce pair generated by the recipient and the second transaction; and
determining a challenge scalar for each of the first blockchain and the second blockchain, each challenge scalar being based on a hashing of a created nonce public key, a received nonce public key, the corresponding public keys and the corresponding transaction identifier for the blockchain in question, where the challenge scalars are used for the encryption of partial signatures used for each blockchain.

12. The method of claim 11, the transmitting the zero-knowledge proof comprising transmitting the determined challenge scalar and a set of commitments to a plurality of bits.

13. The method of claim 10, wherein the encrypted first partial signature comprises a sum of a first partial signature and the selected bitstring, the first partial signature being a combination of an ephemeral nonce private key, the challenge, and the first private key.

14. The method of claim 13, wherein the first signature comprises the first partial signature and a third partial signature, the third partial signature being a combination of an ephemeral nonce private key, the challenge, and the third private key.

15. The method of claim 13, the verifying that the encrypted first private key and the encrypted second private key include valid private keys comprising verifying that $$\sigma_{secp}^A G_{secp} = R_{secp}^A + eA_{secp} + A_{adapt}^{secp}$$

$$\sigma_{ed}^A G_{ed} = R_{ed}^A + eA_{ed} + A_{adapt}^{ed}.$$

16. The method of claim 10, the creating the first transaction further comprising creating a first ephemeral nonce pair and a second ephemeral nonce pair, the method further comprising transmitting nonce public keys from the two nonce pairs and an identifier of the created transaction to the recipient.

17. The method of claim 10, where the zero-knowledge proof is a ring signature.

* * * * *